United States Patent
Li et al.

(10) Patent No.: US 9,778,355 B2
(45) Date of Patent: Oct. 3, 2017

(54) SIGNAL PROCESSING METHOD AND DEVICE FOR FREQUENCY-MODULATED CONTINUOUS WAVEFORM RADAR SYSTEM

(71) Applicant: Wistron NeWeb Corporation, Hsinchu (TW)

(72) Inventors: Jeng-Da Li, Hsinchu (TW); Chi-Cheng Kuo, Hsinchu (TW); Cheng-Hsiung Hsu, Hsinchu (TW); Chi-Yung Liao, Hsinchu (TW); Chien-Chung Tseng, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 507 days.

(21) Appl. No.: 14/613,370

(22) Filed: Feb. 4, 2015

(65) Prior Publication Data
US 2015/0276929 A1 Oct. 1, 2015

(30) Foreign Application Priority Data
Apr. 1, 2014 (TW) .............................. 103112128 A

(51) Int. Cl.
*G01S 13/93* (2006.01)
*G01S 13/58* (2006.01)
(Continued)

(52) U.S. Cl.
CPC .......... *G01S 13/931* (2013.01); *G01S 13/347* (2013.01); *G01S 13/52* (2013.01); *G01S 13/58* (2013.01);
(Continued)

(58) Field of Classification Search
CPC .... G01S 13/931; G01S 7/35; G01S 2007/356; G01S 13/34; G01S 13/343; G01S 13/345; G01S 13/347; G01S 13/52; G01S 13/58
(Continued)

(56) References Cited

U.S. PATENT DOCUMENTS

| 5,892,478 A | 4/1999 | Moss |
| 6,384,769 B1 * | 5/2002 | Mitsumoto ............. G01S 13/34 342/104 |

(Continued)

FOREIGN PATENT DOCUMENTS

| CN | 100478702 C | 4/2009 |
| CN | 100590451 C | 2/2010 |
| JP | 11344560 | 12/1999 |

OTHER PUBLICATIONS

Yan Wu et al., "Detection Performance Improvement of FMCW Radar Using Frequency Shift", joint WIC/IEEESP Symposium on Information Theory and Signal Processing in the Benelux, Brussels, Belgium, May 10, 2011, pp. 1-8.

*Primary Examiner* — Peter M Bythrow
(74) *Attorney, Agent, or Firm* — Winston Hsu

(57) ABSTRACT

A signal processing method for a frequency-modulated continuous waveform (FMCW) radar system includes receiving a plurality of feedback signals from a plurality of targets and performing analog to digital conversion on the plurality of feedback signals to obtain a digital receiving signal corresponding to the plurality of feedback signals, performing a window function on the digital receiving signal to obtain a window transformation signal corresponding to the digital receiving signal, performing time-domain to frequency-domain conversion on the window transformation signal to obtain a spectrum signal of the window transformation signal, performing two beat frequency detections on the spectrum signal, and determining distances and (Continued)

speeds of the plurality of targets in comparison to the FMCW radar system according to results of the two beat frequency detections.

13 Claims, 8 Drawing Sheets

(51) Int. Cl.
 *G01S 13/34* (2006.01)
 *G01S 13/52* (2006.01)
 *G01S 7/35* (2006.01)
(52) U.S. Cl.
 CPC .............. *G01S 7/35* (2013.01); *G01S 13/34* (2013.01); *G01S 2007/356* (2013.01)
(58) Field of Classification Search
 USPC ........................................................ 342/112
 See application file for complete search history.

(56) References Cited

U.S. PATENT DOCUMENTS

| | | | | |
|---|---|---|---|---|
| 6,606,052 | B1* | 8/2003 | Miyahara | G01S 13/343 342/107 |
| 6,888,494 | B2* | 5/2005 | Tamatsu | G01S 13/345 342/109 |
| 7,339,518 | B2* | 3/2008 | Natsume | G01S 7/36 342/109 |
| 8,085,184 | B2* | 12/2011 | Takabayashi | G01S 13/343 342/104 |
| 9,110,152 | B2* | 8/2015 | Ando | G01S 7/352 |
| 9,157,992 | B2* | 10/2015 | Wang | G01S 13/0218 |
| 9,429,649 | B2* | 8/2016 | Kawabe | G01S 7/354 |
| 2003/0222812 | A1 | 12/2003 | Kishida | |
| 2009/0315761 | A1* | 12/2009 | Walter | G01S 13/345 342/200 |

\* cited by examiner

SIGNAL PROCESSING METHOD AND DEVICE FOR FREQUENCY-MODULATED CONTINUOUS WAVEFORM RADAR SYSTEM

BACKGROUND OF THE INVENTION

1. Field of the Invention

The present invention relates to a signal processing method and a signal processing device for a frequency-modulated continuous waveform (FMCW) radar system, and more particularly, to a signal processing method and a signal processing device capable of enhancing tracing stability of the FMCW radar system and reducing missing rate of the FMCW radar system.

2. Description of the Prior Art

According to the statistics, most of traffic accidents are related to drivers' distraction. If a driver is alerted at 0.5 seconds before being likely to have a collision, it can avoid at least 60% of rear-end collisions, 30% of head-on collisions and 50% of road ramp related traffic accidents. If alerted before one second, it can avoid 90% of traffic accidents. The statistics shows traffic accidents can be effectively reduced if the drives have enough reaction time. Vehicle alarm systems, e.g., a blind spot detection (BSD) system, a forward/rear collision warning system, are smart vehicle equipment developed for such needs.

Common vehicle alarm systems utilize frequency-modulated continuous waveform (FMCW) radar technique to achieve early warning. More specifically, the vehicle alarm system uses an image self-recognition method of machine vision to detect obstacles in specific areas on left/right/front sides of a vehicle, so as to send out an alarm before collision happens. Nevertheless, under a situation that there are two targets within a sensing area of the FMCW radar system, if a velocity difference or a distance difference of these two targets is so small that these two targets may not be distinguished, a miss of the vehicle alarm system may happen, i.e., the vehicle alarm system fails to send out an alarm when the vehicle alarm system should alarm, which may indirectly cause traffic accidents.

In such a situation, how to enhance an accuracy of the FMCW system and reduce a missing rate of the FMCW system, so as to enhance traffic safety, is a significant objective in the field.

SUMMARY OF THE INVENTION

It is therefore a primary objective of the present invention to provide a signal processing method and a signal processing device for frequency-modulated continuous waveform radar system, to improve disadvantages of the prior art.

An embodiment of the present invention discloses a signal processing method for a frequency-modulated continuous waveform (FMCW) radar system, comprising receiving a plurality of feedback signals from a plurality of targets, and performing analog to digital conversion on the plurality of feedback signals, to obtain a digital receiving signal corresponding to the plurality of feedback signals; performing a window function transformation on the digital receiving signal, to obtain a window transformation signal corresponding to the digital receiving signal; performing time-domain to frequency-domain conversion on the window transformation signal, to obtain a spectrum signal of the window transformation signal; performing two beat frequency detections on the spectrum signal; and determining distances and speeds of the plurality of targets in comparison to the FMCW radar system according to results of the two beat frequency detections.

An embodiment of the present invention further discloses a signal processing device for a frequency-modulated continuous waveform (FMCW) radar system, comprising an analog to digital converter, for receiving a plurality of feedback signals from a plurality of targets, and performing analog to digital conversion on the plurality of feedback signals, to obtain a digital receiving signal corresponding to the plurality of feedback signals; and a digital signal processing module, for executing a digital signal processing method, the digital signal processing method comprising performing a window function transformation on the digital receiving signal, to obtain a window transformation signal corresponding to the digital receiving signal; performing time-domain to frequency-domain conversion on the window transformation signal, to obtain a spectrum signal of the window transformation signal; performing two beat frequency detections on the spectrum signal; and determining distances and speeds of the plurality of targets in comparison to the FMCW radar system according to results of the two beat frequency detections.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
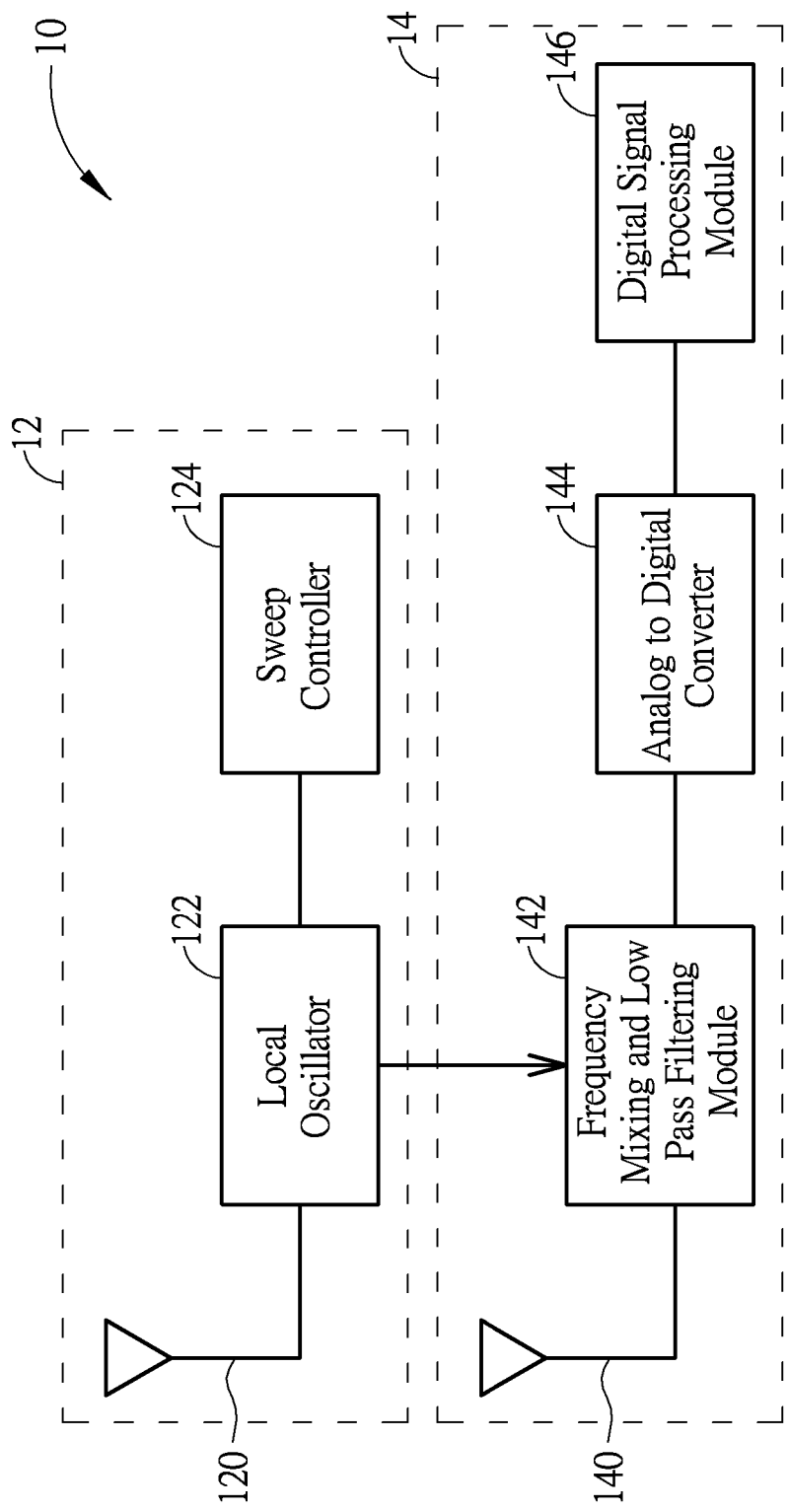
FIG. 1 is a schematic diagram of a frequency-modulated continuous waveform radar system according to an embodiment of the present invention.

Please refer to FIG. 1, which is a schematic diagram of a frequency-modulated continuous waveform (FMCW) radar system 10 according to an embodiment of the present invention. The FMCW radar system 10 is installed on a vehicle such as a car, a bus, a truck, etc., for detecting whether an obstacle, such as another vehicle or a person, is within a specific range, and sending out an alarm signal accordingly, to avoid drivers causing traffic accidents because of carelessness, blind spots, etc. The FMCW radar system 10 is functionally divided into a transmission portion 12 and a reception portion 14. The transmission portion 12 comprises a transmission antenna 120, a local oscillator 122 and a sweep controller 124. The reception portion 14 comprises a reception antenna 140, a frequency mixing and low pass filtering module 142, an analog to digital converter 144 and a digital signal processing module 146. Sensing operations of the FMCW radar system 10 can be briefly described as follows. The sweep controller 124 controls the local oscillator 122 to generate FMCW signals or other extensions of FMCW signals, and emits the FMCW signals outward through the transmission antenna 120. Correspondingly, the reception antenna 140 receives signals reflected from targets, the frequency mixing and low pass filtering module 142 performs frequency mixing on the reflected signals with the sinusoidal signal generated by the local oscillator 122 and performs low pass filtering, to obtain beat frequency signals between these two. The analog to digital converter 144 samples the beat frequency signals and converts the beat frequency signals into digital signals. The digital signal processing module 146 computes and obtains information of the targets such as ranges, moving speeds, etc., in relation to the FMCW radar system 10.

In order to compute information of the targets such as ranges, moving speeds, etc., the digital signal processing module 146 needs to convert the digital beat frequency signals from time domain into frequency domain. A common method is using fast Fourier transform (FFT), but not limited thereto. Nevertheless, in order to reduce spectrum leakage, before performing fast Fourier transform, the digital signal processing module 146 may multiply the sampled beat frequency signals by an window function in time domain, to avoid mutual interference of the target reflected signals, which causes a reduction of signal-to-noise ratio and affects performance of the FMCW radar system 10. After the window function and fast Fourier transformation, the digital signal processing module 146 utilizes a fixed or a dynamic threshold value to detect the beat frequencies of the targets, then utilizing the beat frequencies of two or multiple chirp time according to different modulated patterns, or a beat frequency and its phase information, to obtain the information of the targets such as the ranges, the moving speeds, etc.

Figure 2:
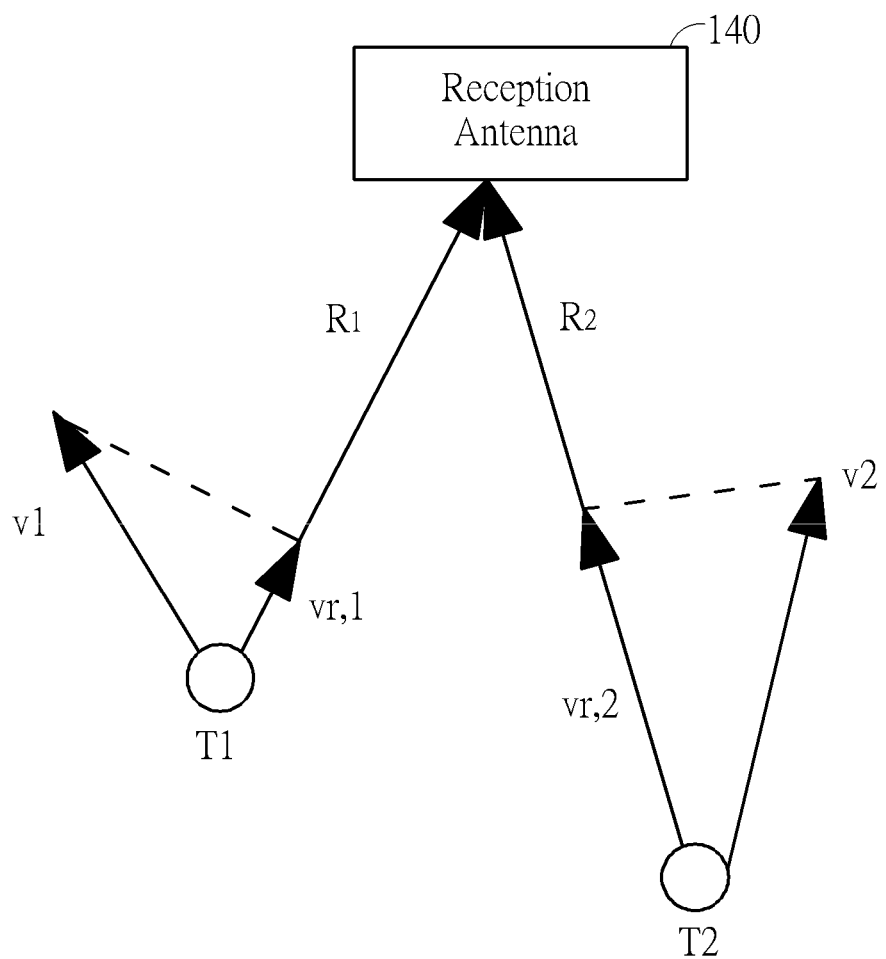
FIG. 2 is a schematic diagram of the frequency-modulated continuous waveform radar system in FIG. 1 sensing two targets.

As can be seen, by using the window function, the fast Fourier transformation and the beat frequency detection, the digital signal processing module 146 may obtain the information of the targets such as the ranges, the moving speeds, etc. Nevertheless, the digital signal processing module 146 performs spectrum analysis in a limited time, and the capability of distinguishing objects thereof would be limited by a bandwidth of beat frequency $f_b$ in frequency domain. For example, as shown in FIG. 2, if distances of targets T1, T2 in relation to the reception antenna 140 are $R_1$, $R_2$, respectively, and relative speeds are $v_{r,1}$, $v_{r,2}$, respectively. The condition that the targets T1, T2 can be distinguished correctly by the digital signal processing module 146, i.e., of the beat frequency corresponding to the targets T1, T2 in frequency domain being correctly resolved is:

$$|R_1 - R_2| \geq 2 \cdot D \cdot \Delta R \text{ or } |v_{r,1} - v_{r,2}| \geq 2 \cdot D \cdot \Delta V \qquad \text{(eq. 1)};$$

where $$\Delta R = \frac{c}{2B} \qquad \text{(eq. 2)}$$

is a range resolution of the FMCW radar system 10 determined by the bandwidth B of the sweep controller 124, $$\Delta V = \frac{c}{2f_0 T_m} \qquad \text{(eq. 3)}$$

is a velocity resolution of the FMCW radar system 10 determined by an initial frequency $f_0$ and a modulation time $T_m$ of the sweep controller 124, and D≥1, which is an affection caused by a main-lobe attenuation of the window function.

As can be seen from eq. 1, when the velocity difference of the targets T1, T2 is smaller than $2 \cdot D \cdot \Delta V$ and the range difference is smaller than $2 \cdot D \cdot \Delta R$, the targets T1, T2 are not able to be distinguished by the FMCW radar system 10, which may affect an accuracy of tracing targets and cause a miss, i.e., an alarm fails to be sent out when it should be. Traffic accidents may even be indirectly caused.

Figure 3:
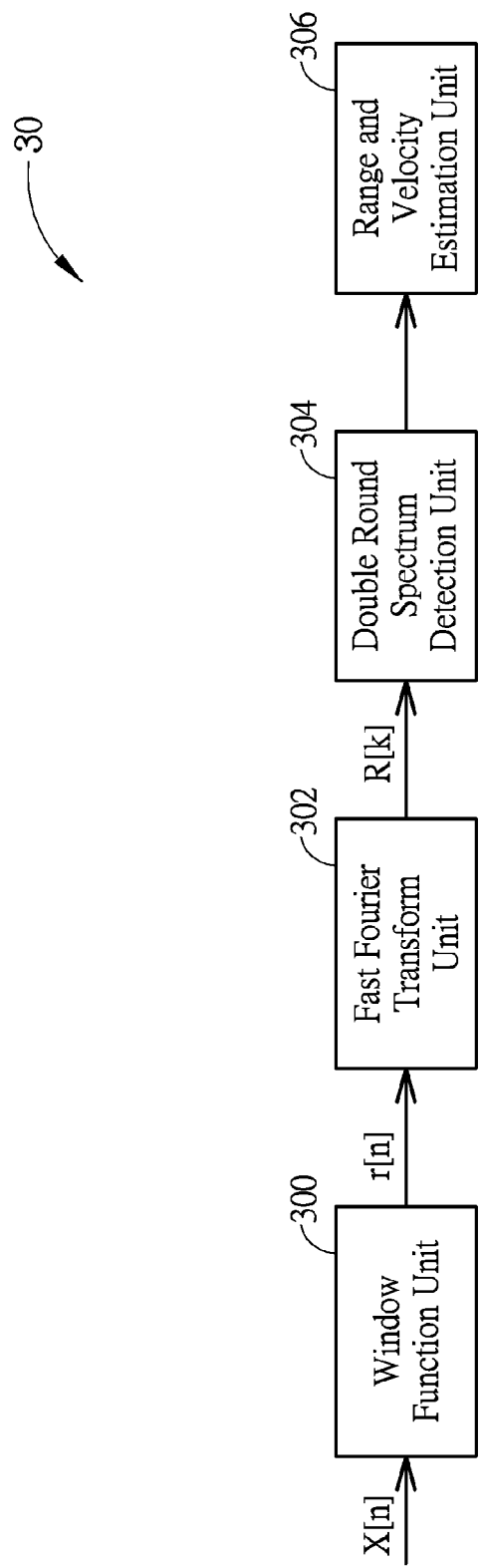
FIG. 3 is a schematic diagram of a digital signal processing module according to an embodiment of the present invention.

In order to enhance the accuracy of the FMCW radar system 10, the present invention further modifies the operations of the digital signal processing module 146, in which a double round spectrum detection process is utilized to detect beat frequencies in spectrum which are close to each other, so as to improve the accuracy of tracing targets and reduce the missing rate of radar. In detail, please refer to FIG. 3, which is a schematic diagram of a digital signal processing module 30 according to an embodiment of the present invention. The digital signal processing module 30 is applied in the FMCW radar system 10, and may replace the digital signal processing module 146 in FIG. 1. The digital signal processing module 30 comprises an window function unit 300, a fast Fourier transform unit 302, a double round spectrum detection unit 304 and a range and velocity estimation unit 306. Moreover, the double round spectrum detection unit 304 may detect beat frequencies which are closed to each other in frequency domain. That is, the double round spectrum detection unit 304 performs a first round beat frequency detection and regards the frequency components detected from the first round detection as interference to other smaller targets. Through a spectrum peak location estimation, a more accurate spectrum location information is obtained. After spectrum elimination, the double round spectrum detection unit 304 performs a second round target detection, to acquire a beat frequency information of another target which is originally covered. In such a situation, after the double round spectrum detection, the condition of targets being distinguishable is improved as:

$$|R_1 - R_2| \geq 2 \cdot D \cdot \Delta R \cdot \alpha \text{ or } |v_{r,1} - v_{r,2}| \geq 2 \cdot D \cdot \Delta V \cdot \alpha, \ 0 \leq \alpha \leq 1 \qquad \text{(eq. 4)};$$

where $\alpha$ is an improving factor, which can be achieved as 0.6 at least. In other words, targets not distinguished by the digital signal processing module 146 are distinguished and detected by the digital signal processing module 30 because of the use of the double round spectrum detection unit 304.

For clearly explaining the operational principles of the digital signal processing module 30, a received signal model of the FMCW radar system 10 is analyzed first, and a signal processing method of the digital signal processing module 30 is then described.

First of all, suppose at time t, there are $N_t$ targets ($N_t \geq 1$) within a sensing area or a surrounding area of the FMCW radar system 10. In the $k^{th}$ chirp time, without considering noise, a received signal x(t) outputted by the frequency mixing and low pass filtering module 142 to the analog to digital converter 144 can be represented as:

$$x(t) = \sum_{i=0}^{N_t - 1} A_i \exp(j 2 \pi f_{b,i} t), \ (k-1) T_m \leq t < k T_m; \qquad \text{(eq. 5)}$$

where $A_i$ represents a complex gain of the $i^{th}$ target reflected signal after merging phase information, $f_{b,i}$ is a beat frequency of the target reflected signal, and $T_m$ represents a modulation time of the FMCW signal. Suppose a sampling frequency of the analog to digital converter 144 is $F_s$, i.e., sampling time is $T_s$, a digital receiving signal $x[n]$ after sampling is:

$$x[n] = \sum_{i=0}^{N_t-1} A_i \exp\left(j2\pi \frac{f_{b,i}}{F_s} n\right), n = 0, \ldots, N-1; \quad \text{(eq. 6)}$$

In order to fit requirements of FFT to be time efficient, the modulation time $T_m$ is set to be $T_m = NT_s$, where N is a power of 2. A frequency resolution $\Delta f$ of FFT is $\Delta f = F_s/N$. As mentioned in the above, when the discrete beat frequency $$\frac{f_{b,i}}{F_s}$$

is not an integer multiple of the frequency resolution $\Delta f$, spectrum leakage occurs, which causes mutual interference among the target reflected signals and causes reduction of signal-to-noise ratio. Therefore, the window function unit 300 of the digital signal processing module 30 is utilized for multiplying the digital receiving signal $x[n]$ by an window function $w[n]$ in time domain, where the window function $w[n]$ may be a rectangular window, a Hanning window, or other types of window functions. Nevertheless, the window function $w[n]$ widens the spectrum of the digital receiving signal $x[n]$ in D times, and reduces the range and velocity resolution. Specifically, a window transformation signal $r[n]$, which is the digital receiving signal $x[n]$ converted through the window function $w[n]$, is:

$$r[n] = w[n] \cdot x[n] = \sum_{i=0}^{N_t-1} w[n] \cdot A_i \exp\left(j2\pi \frac{f_{b,i}}{F_s} n\right), \quad \text{(eq. 7)}$$

for $n = 0, \ldots, N-1$.

Assume the sampling point N in eq. 7 is infinite for facilitating the analysis. Mathematically, after performing discrete time Fourier transform (DTFT), the window transformation signal $r[n]$ outputted by the window function unit 300 is converted as a spectrum signal, which is:

$$R(2\pi f) = W(2\pi f) * X(2\pi f) \quad \text{(eq. 8)}$$

$$= 2\pi \sum_{i=0}^{N_t-1} W(2\pi f) * A_i \delta\left(2\pi\left(f - \frac{f_{b,i}}{F_s}\right)\right)$$

$$= 2\pi \sum_{i=0}^{N_t-1} A_i W\left(2\pi\left(f - \frac{f_{b,i}}{F_s}\right)\right);$$

where (*) is a convolution operator, and $\delta(f)$ is an impulse function in frequency domain. Results of a finite length FFT may be regarded as results of performing sampling on the continuous spectrum obtained by DTFT, which is:

$$R[k] = R(2\pi f)\big|_{f=\frac{k}{N}F_s} \quad \text{(eq. 9)}$$

$$= N \sum_{i=0}^{N_t-1} A_i W\left(2\pi\left(\frac{k}{N}F_s - \frac{f_{b,i}}{F_s}\right)\right)$$

$$= N \sum_{i=0}^{N_t-1} A_i W\left(\frac{2\pi}{N}(kF_s - q_{b,i})\right);$$

where $R[k]$ and $W[k]$ respectively represent the discrete spectrum signals of the digital receiving signal $x[n]$ and the window function $w[n]$, and $$q_{b,i} = \frac{N f_{b,i}}{F_s}$$

is a normalized beat frequency.

As can be seen from eq. 9, the discrete spectrum signal $R[k]$, which is obtained by performing FFT on the received signal $x(t)$ under multiple targets environment, is results of performing sampling in frequency domain on the summation of different shifted version of the window function $w[n]$ in frequency domain. As can be seen from the signal model, when two targets are too close to each other, the two targets might not be distinguishable. However, since the spectrum of the window function $w[n]$ is known, if the normalized beat frequency $q_{b,i}$ and the complex gain $A_i$ are correctly obtained, part of spectrum components can be cancelled, so as to eliminate affection of the detected target beat frequencies on other target beat frequencies, and acquire target beat frequencies which are originally covered.

Figure 4:
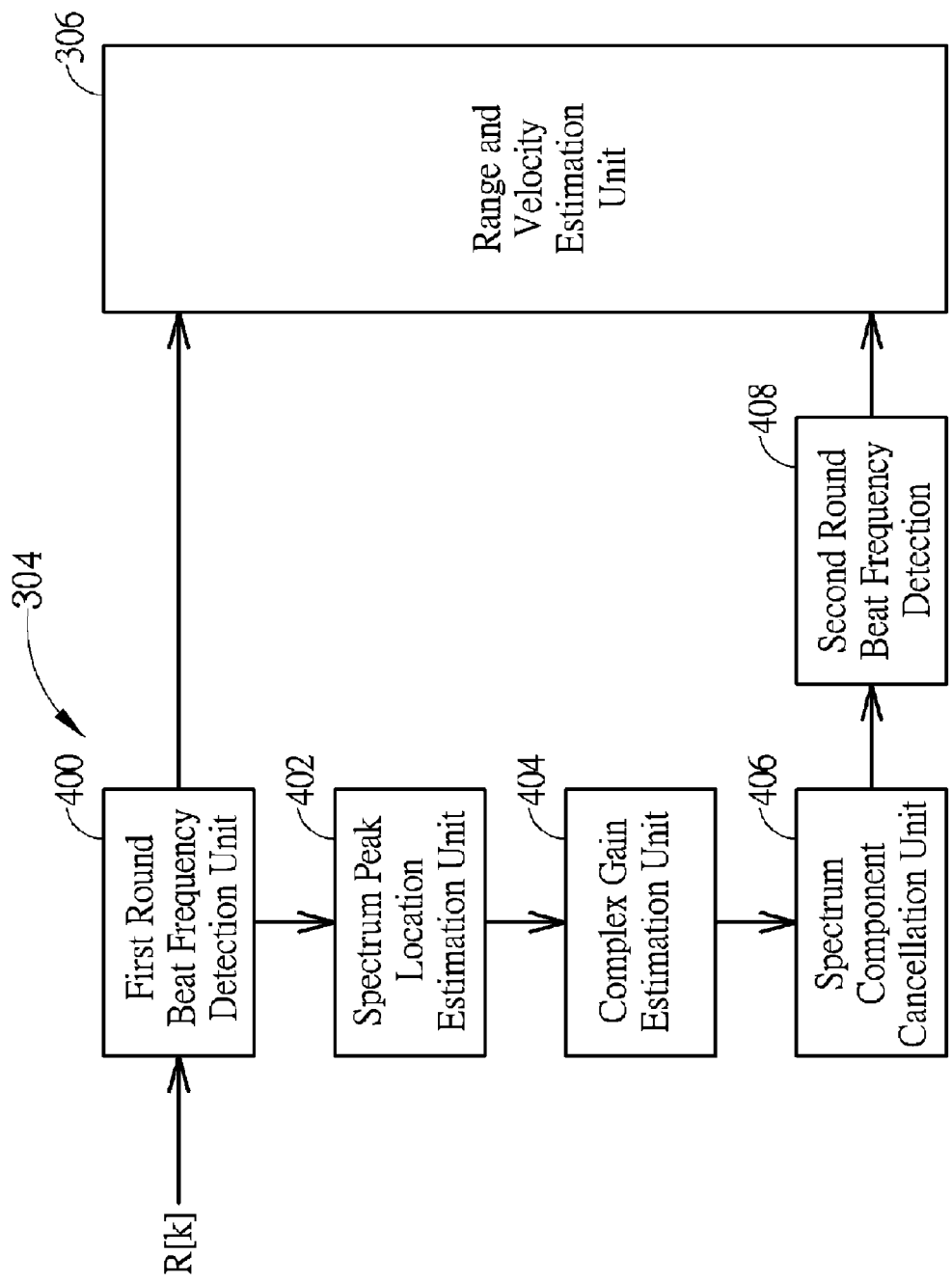
FIG. 4 is a schematic diagram of detail structures of a double round spectrum detection unit in FIG. 3.

Please refer to FIG. 4, which is a schematic diagram of detail structures of the double round spectrum detection unit 304. The double round spectrum detection unit 304 comprises a first round beat frequency detection unit 400, a spectrum peak location estimation unit 402, a complex gain estimation unit 404, a spectrum component cancellation unit 406 and a second round beat frequency detection 408. The first round beat frequency detection unit 400 is utilized for obtaining the beat frequencies of the targets, and employs a fixed or a floating threshold value, e.g., a constant false alert rate (CFAR) detector to perform detection on the discrete spectrum signal $R[k]$, to acquire spectrum components within the discrete spectrum signal $R[k]$ which are greater than the threshold values and find the spectrum peak locations. However, limited by the frequency resolution, the first round beat frequency detection unit 400 only acquires integer parts $k_{D,m}$ of the beat frequencies, which is $$k_{D,m} = \text{Round}(q_{D,m}), \ 0 \le m \le N_D \quad \text{(eq. 10)}$$

where Round(.) represents an operation of outputting the closest integer. Each detected beat frequency $q_{D,m}$ corresponds to a beat frequency $q_{b,i}$ of a real target. Limited by the resolution, only $m = N_{D,1}$ targets are detectable.

Next, the spectrum peak location estimation unit 402 is utilized for a finer frequency estimation. First, the frequency detected in eq. 10 can be rewritten as:

$$q_{D,m} = k_{D,m} + p_m \ 0 \le m < N_{D,1} \quad \text{(eq. 11)};$$

where $p_m$ is a fractional part of the $m^{th}$ detected frequency. As known in the art, this fractional part may be estimated by $$p_m = \frac{P(|R[k_{D,m}+1]| - |R[k_{D,m}-1]|)}{(|R[k_{D,m}]| + |R[k_{D,m}+1]| + |R[k_{D,m}-1]|)}, \quad \text{(eq. 12)}$$

$$0 \le m < N_{D,1},$$

where |.| is an operation of taking amplitude of complex signal, and P is an adjusting factor corresponding to different window functions. After obtaining the frequency integer part $k_{D,m}$ from the first round target detection, the complex gain estimation unit 404 may perform the following operation, to obtain estimate values of the complex gains:

$$A'_m = \frac{R[k_{D,m}]}{W\left(\frac{2\pi}{N}(k_{D,m} - q_{D,m})\right)}, 0 \le m < N_{D,1}. \quad \text{(eq. 13)}$$

The spectrum component cancellation unit 406 performs frequency component cancellation according to the estimated frequencies and the estimated complex gains, to obtain a double round spectrum signal $R_2[k]$ as:

$$R_2[k] = R[k] - \sum_{m=0}^{N_{D,i}-1} A'_i W\left(\frac{2\pi}{N}(k - q_{D,m})\right), 0 \le k < N - 1 \quad \text{(eq. 14)}$$

$$= \sum_{j=0}^{N_{D,2}-1} A'_i W\left(\frac{2\pi}{N}(k - q_{b,j})\right), 0 \le k < N - 1.$$

As can be seen from eq. 14, by cancelling the frequency components within the discrete spectrum signal R[k], the double round spectrum signal $R_2[k]$ only contains targets which are not detected by the first round beat frequency detection unit 400. At this time, the second round beat frequency detection 408 performs the second target detection according to the eliminated frequency amplitude to obtain information of the rest of the targets. Thereby, the targets, which are not distinguishable in eq. 1, may be detected.

Figure 5:
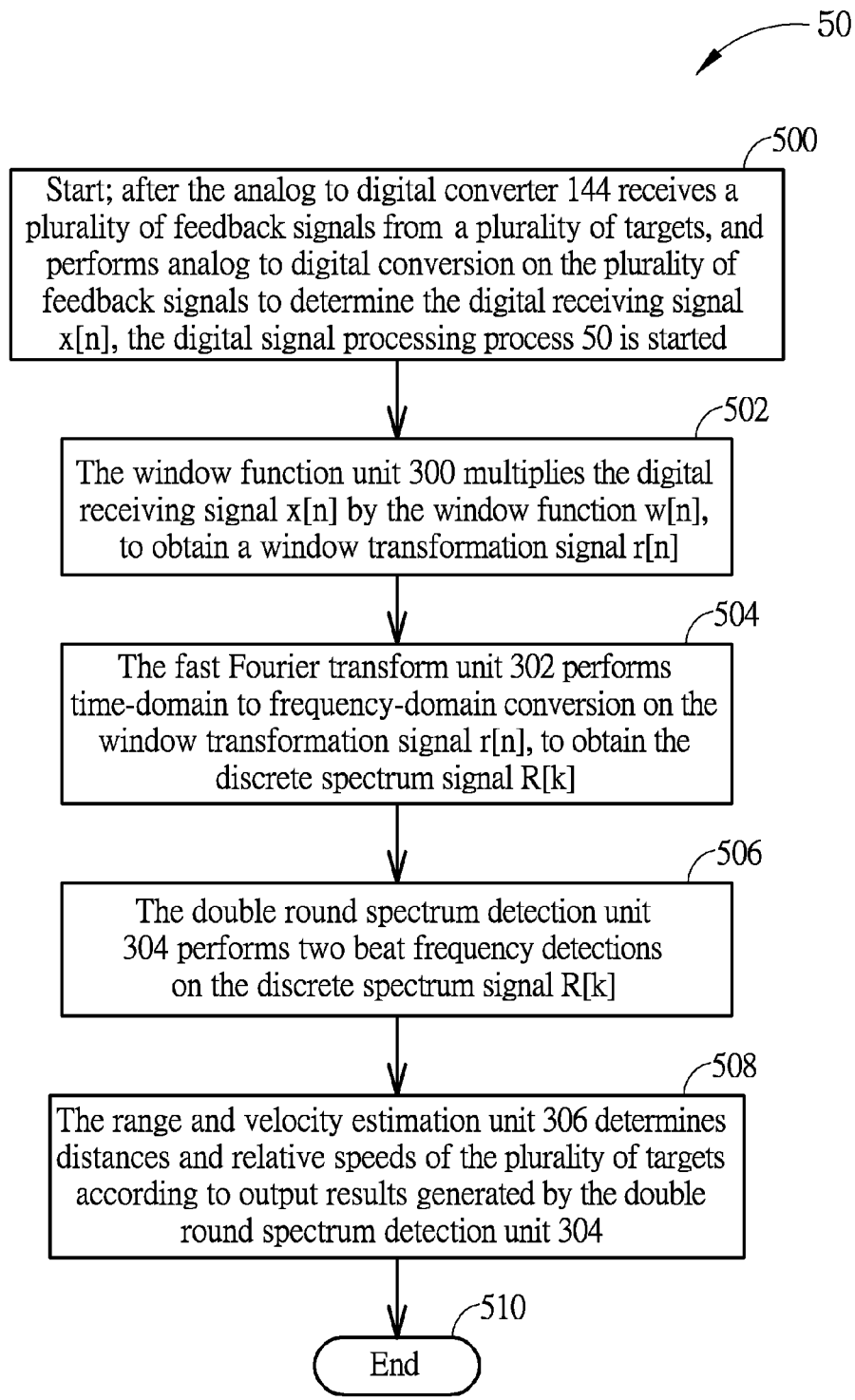
FIG. 5 is a schematic diagram of a digital signal processing process according to an embodiment of the present invention.

The operations of the digital signal processing module 30 described in the above can be summarized into a digital signal processing process 50, as shown in FIG. 5. The digital signal processing process 50 comprises following steps:

Step 500: Start; after the analog to digital converter 144 receives a plurality of feedback signals from a plurality of targets, and performs analog to digital conversion on the plurality of feedback signals to determine the digital receiving signal x[n], the digital signal processing process 50 is started.

Step 502: The window function unit 300 multiplies the digital receiving signal x[n] by the window function w[n], to obtain a window transformation signal r[n].

Step 504: The fast Fourier transform unit 302 performs time-domain to frequency-domain conversion on the window transformation signal r[n], to obtain the discrete spectrum signal R[k].

Step 506: The double round spectrum detection unit 304 performs two beat frequency detections on the discrete spectrum signal R[k].

Step 508: The range and velocity estimation unit 306 determines distances and relative speeds of the plurality of targets according to output results generated by the double round spectrum detection unit 304.

Step 510: End.

Figure 6:
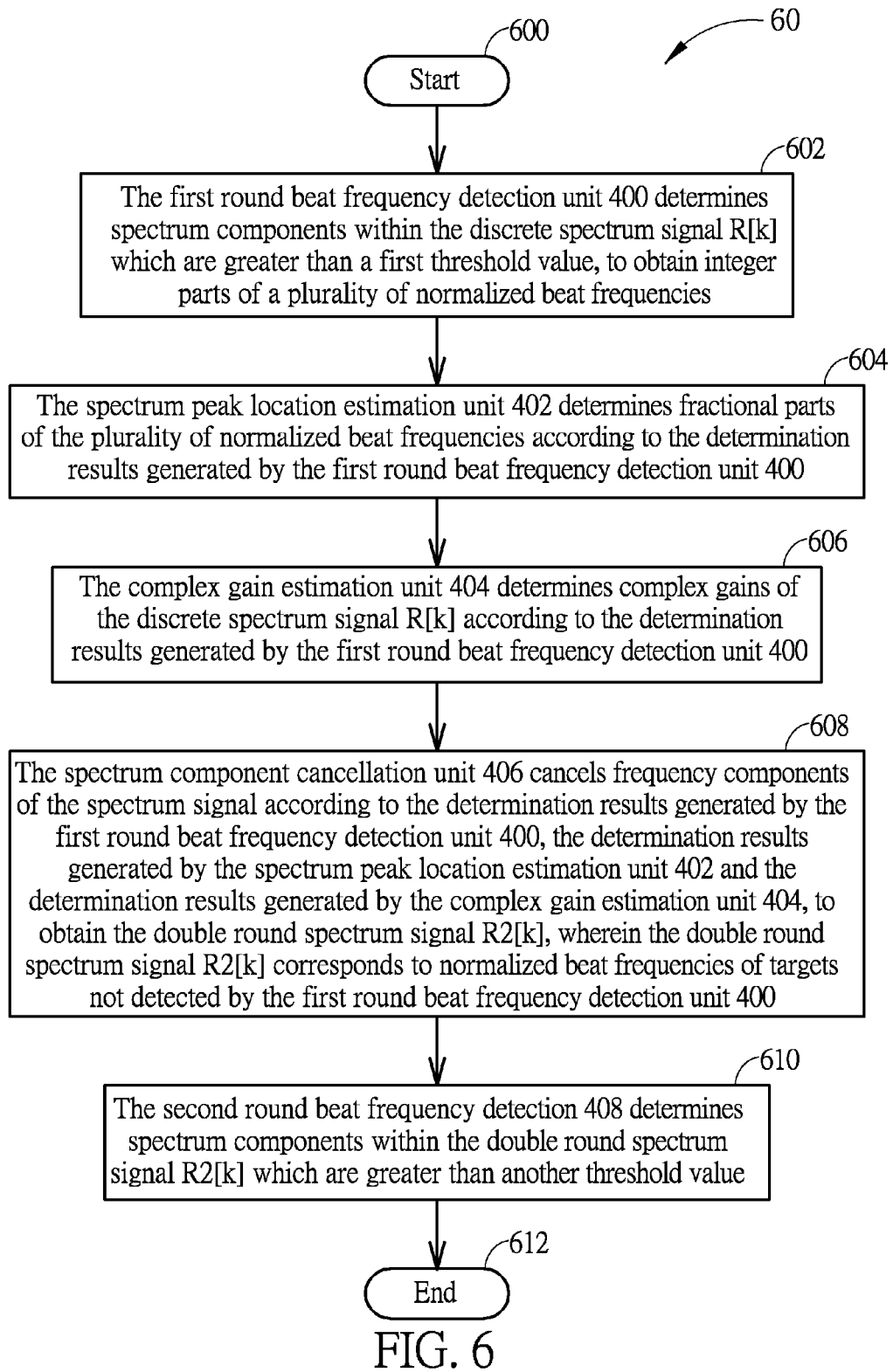
FIG. 6 is a schematic diagram of a double round spectrum detection process according to an embodiment of the present invention.

Moreover, the operations of the double round spectrum detection unit 304 can be summarized into a double round spectrum detection process 60, as shown in FIG. 6. The double round spectrum detection process 60 comprises following steps:

Step 600: Start.

Step 602: The first round beat frequency detection unit 400 determines spectrum components within the discrete spectrum signal R[k] which are greater than a first threshold value, to obtain integer parts of a plurality of normalized beat frequencies.

Step 604: The spectrum peak location estimation unit 402 determines fractional parts of the plurality of normalized beat frequencies according to the determination results generated by the first round beat frequency detection unit 400.

Step 606: The complex gain estimation unit 404 determines complex gains of the discrete spectrum signal R[k] according to the determination results generated by the first round beat frequency detection unit 400.

Step 608: The spectrum component cancellation unit 406 cancels frequency components of the spectrum signal according to the determination results generated by the first round beat frequency detection unit 400, the determination results generated by the spectrum peak location estimation unit 402 and the determination results generated by the complex gain estimation unit 404, to obtain the double round spectrum signal $R_2[k]$, wherein the double round spectrum signal $R_2[k]$ corresponds to normalized beat frequencies of targets not detected by the first round beat frequency detection unit 400.

Step 610: The second round beat frequency detection 408 determines spectrum components within the double round spectrum signal $R_2[k]$ which are greater than another threshold value.

Step 612: End.

Detail operations of the digital signal processing process 50 and the double round spectrum detection process 60 can be referred to the relative paragraphs of the embodiments stated above, and are not narrated herein for brevity. Moreover, a combination of the operations of the analog to digital converter 144 and the operations of the digital signal processing module 30 (i.e., the digital signal processing process 50) maybe regarded as a signal processing method applying for the FMCW radar system 10. Correspondingly, a combination of the analog to digital converter 144 and the digital signal processing module 30 may be regarded as a signal processing device applying for the FMCW radar system 10.

As can be seen from the above, after the double round beat frequency detection, the digital signal processing module 30 is able to detect targets which are not distinguishable in eq. 1, effectively enhances the tracing accuracy of the FMCW radar system 10, and reduces the missing rate of the radar system, so as to enhance traffic safety. Notably, the digital signal processing module 30 is an embodiment of the present invention, which employs blocks representing programming code or operation principles of different processes. In fact, the digital signal processing module 30 may be implemented by a processor and a memory. The memory stores programming codes corresponding to the digital signal processing process 50 and the double round spectrum detection process 60, to instruct the processor to perform the related operations. The processor applied for the digital signal processing module 30 may be a microprocessor or application-specific integrated circuits (ASIC). The memory applied for the digital signal processing module 30 may be any information storage device such as read-only memory (ROM), random-access memory (RAM), CD-ROMs, magnetic tapes, floppy disks, optical data storage devices, etc., and are not limited herein.

In addition, the aforementioned embodiments illustrate a double round detection. In fact, those who skilled in the art may adequately derive detection processes which comprise more than two rounds, and are not limited herein. Moreover, the threshold values used by the first round beat frequency detection unit 400 and the second round beat frequency detection 408 may be different or the same. The threshold values may also be constant values or variable values, depending on the system requirements. Furthermore, the FMCW radar system 10 may be applied on blind spot detection (BSD) systems, forward/rear collision warning systems, but not limited herein. All FMCW radar systems using machine vision to recognize targets may adopt the detection method of the present invention.

The improvement of the accuracy of the FMCW radar system 10 utilizing the digital signal processing module 30 or the digital signal processing process 50 can be verified by experiments or simulations. For example, in FIG. 2, suppose a bandwidth used by the FMCW radar system 10 is 150 MHz, the chirp time is 10 ms, and an initial frequency $f_0$ of the FMCW sweep controller 124 is 24 GHz, the FMCW radar system 10 is disposed at an front end of the vehicle, and the relative speeds $v_{r,1}$, $v_{r,2}$ of the targets T1, T2 are 12.5 m/s, the distances of the targets T1, T2 in relation to the reception antenna 140 are 18.4 meter and 20 meters. In such a situation, if the FMCW radar system 10 does not use the double round detection of the digital signal processing module 30 (i.e., using the digital signal processing module 146), according to eq. 1, the range resolution and the velocity resolution are 1 meter and 0.625 m/s. In other words, a capability of distinguishing targets is only 2 meters. Thus, three conditions might happen: (1) a reflection energy of the target T1 is much larger than a reflection energy of the target T2, only the target T1 is detected by the radar, and the target T2 is missed; (2) a reflection energy of the target T2 is much larger than a reflection energy of the target T1, only the target T2 is detected by the radar, and the target T1 is missed; (3) if the reflection energy of the targets T1, T2 are comparable, no target is detected at the original positions of the targets T1, T2, and a merging ghost target is detected at an average position of the targets T1, T2, causing a wrong alert.

Figure 7:
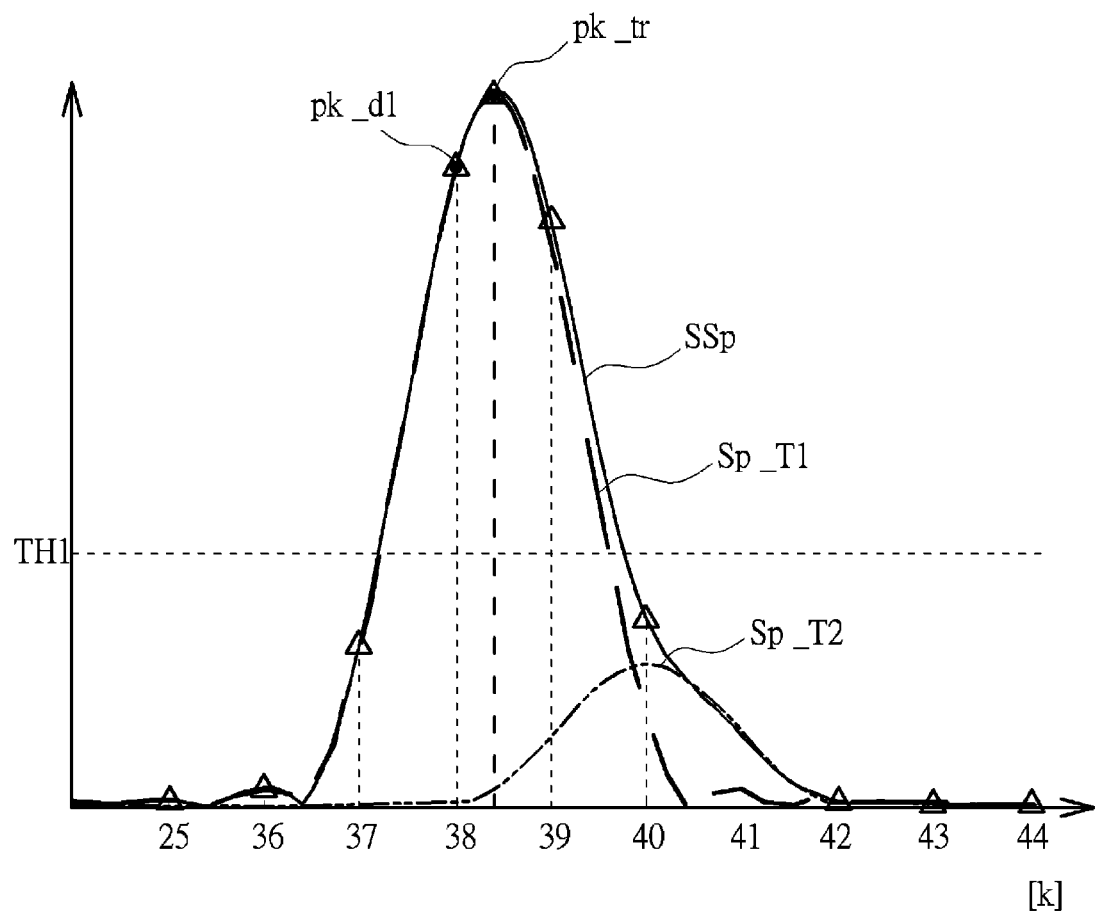
FIG. 7, 8 are schematic diagram of spectrums of embodiments of the present invention.
Figure 8:
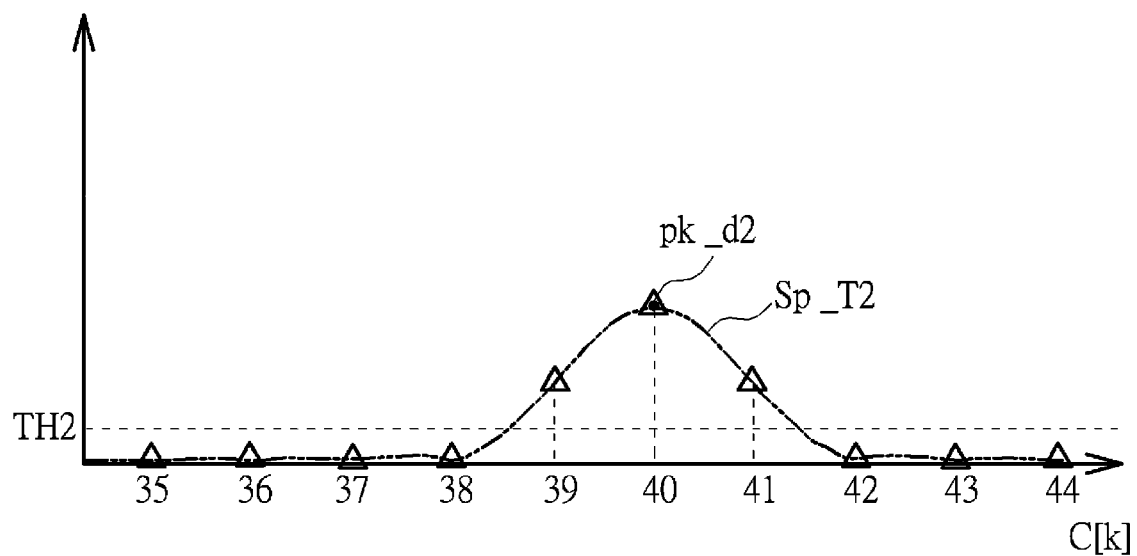

In comparison, when the FMCW radar system 10 adopts the double round detection mechanism of the digital signal processing module 30 of the present invention, according to the above parameters, the digital beat frequencies are 38.4 and 40. Suppose that the complex gain of the target T1 is 1 and the complex gain of the target T2 is 0.2, the spectrum obtained by FFT is shown as FIG. 7. In FIG. 7, triangles represent the frequency sampling points, a curve Sp_T1 represents the FFT results of the target T1, a curve Sp_T2 represents the FFT results of the target T2, a curve SSp represents a summation of the FFT results of the targets T1 and T2, TH1 represents a threshold value used in the first round beat frequency detection unit 400, pk_d1 represents a spectrum component corresponding to the target T1 in the first round beat frequency detection, and pk_tr represents the actual spectrum component corresponding to the target T1. Therefore, after the first round beat frequency detection, only the target T1 is detected, and the discrete beat frequency is 38, which is an integer part of the actual beat frequency. Next, according to the operations of eq. 12, eq. 13 and eq. 14 stated in the above, the frequency component of the target T1 is eliminated, and the eliminated spectrum is shown in FIG. 8. In FIG. 8, triangles represent the sampling points, a curve Sp_T2 represents the FFT results of the target T2, TH2 represents a threshold value used in the second round beat frequency detection unit 408, and pk_d2 represents a spectrum component corresponding to the target T2 in the second round beat frequency detection. Therefore, as can be seen from FIG. 8, the eliminated spectrum, in which the spectrum components of the target T1 are eliminated, matches the actual spectrum of the target T2. The second round beat frequency detection is performed on the eliminated spectrum, and the beat frequency information of the target T2 may be obtained. Hence, after the double round beat frequency detection, both the targets T1, T2 are detected correctly, and there is no miss caused by too close distances or velocities of targets and no wrong alert caused by ghost targets.

As can be seen from the above, the double round beat frequency detection process may improve the object distinguishing capability of the FMCW radar system, and protect small targets from being covered by large targets with close distance and velocity, so as to enhance the tracing stability of the FMCW radar system, reduce the missing rate of the FMCW radar system, and enhance the traffic safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing method for a frequency-modulated continuous waveform (FMCW) radar system, comprising:
   receiving a plurality of feedback signals from a plurality of targets, and performing analog to digital conversion on the plurality of feedback signals, to obtain a digital receiving signal corresponding to the plurality of feedback signals;
   performing a window function transformation on the digital receiving signal, to obtain a window transformation signal corresponding to the digital receiving signal;
   performing time-domain to frequency-domain conversion on the window transformation signal, to obtain a spectrum signal of the window transformation signal;
   performing two beat frequency detections on the spectrum signal; and
   determining distances and speeds of the plurality of targets in comparison to the FMCW radar system according to results of the two beat frequency detections.

2. The signal processing method of claim 1, wherein the step of performing the window function transformation on the digital receiving signal is multiplying the digital receiving signal by an window function.

3. The signal processing method of claim 2, wherein the window function is selected from a rectangular window or a Hanning window.

4. The signal processing method of claim 1, wherein the step of performing the time-domain to frequency-domain conversion on the window transformation signal is performing a discrete fast Fourier transform, to convert the window transformation signal from a time domain into a frequency domain and obtain the discrete spectrum signal.

5. The signal processing method of claim 1, wherein the step of performing the two beat frequency detections on the spectrum signal comprises:
   performing a first round beat frequency detection on the spectrum signal, to determine spectrum components greater than a first threshold value within the spectrum signal, to obtain an integer part of a plurality of normalized beat frequencies;

determining a fractional part of the plurality of normalized beat frequencies according to the integer part of the plurality of normalized beat frequencies;

determining a complex gain of the spectrum signal according to the integer part of the plurality of normalized beat frequencies;

cancelling a frequency component of the spectrum signal according to the integer part of the plurality of normalized beat frequencies, the fractional part of the plurality of normalized beat frequencies, and the complex gain of the spectrum signal, to obtain a double round spectrum signal, wherein the double round spectrum signal corresponds to normalized beat frequencies of targets not detected in the first round beat frequency detection; and performing a second round beat frequency detection on the double round spectrum signal, to determine spectrum components greater than a second threshold value within the spectrum signal.

6. A signal processing device for a frequency-modulated continuous waveform (FMCW) radar system, comprising:
an analog to digital converter, for receiving a plurality of feedback signals from a plurality of targets, and performing analog to digital conversion on the plurality of feedback signals, to obtain a digital receiving signal corresponding to the plurality of feedback signals; and
a digital signal processing module, for executing a digital signal processing method, the digital signal processing method comprising:
performing a window function transformation on the digital receiving signal, to obtain a window transformation signal corresponding to the digital receiving signal;
performing time-domain to frequency-domain conversion on the window transformation signal, to obtain a spectrum signal of the window transformation signal;
performing two beat frequency detections on the spectrum signal; and
determining distances and speeds of the plurality of targets in comparison to the FMCW radar system according to results of the two beat frequency detections.

7. The signal processing device of claim 6, wherein the step of performing the window function transformation on the digital receiving signal is multiplying the digital receiving signal by an window function.

8. The signal processing device of claim 7, wherein the window function is selected from a rectangular window, or a Hanning window.

9. The signal processing device of claim 6, wherein the step of performing the time-domain to frequency-domain conversion on the window transformation signal is performing a discrete fast Fourier transform, to convert the window transformation signal from a time-domain into a frequency-domain and obtain the discrete spectrum signal.

10. The signal processing device of claim 6, wherein the step of performing two beat frequency detections on the spectrum signal comprises:
performing a first round beat frequency detection on the spectrum signal, to determining spectrum components greater than a first threshold value within the spectrum signal, to obtain an integer part of a plurality of normalized beat frequencies;
determining a fractional part of the plurality of normalized beat frequencies according to the integer part of the plurality of normalized beat frequencies;
determining a complex gain of the spectrum signal according to the integer part of the plurality of normalized beat frequencies;

cancelling a frequency component of the spectrum signal according to the integer part of the plurality of normalized beat frequencies, the fractional part of the plurality of normalized beat frequencies, and the complex gain of the spectrum signal, to obtain a double round spectrum signal, wherein the double round spectrum signal corresponds to normalized beat frequencies of the targets not detected in the first round beat frequency detection; and performing a second round beat frequency detection on the double round spectrum signal, to determining spectrum components greater than a second threshold value within the spectrum signal.

11. The signal processing device of claim 6, wherein the digital signal processing module comprises a memory and a processor, and the memory stores a program code, for instructing the processor to execute the signal processing method.

12. The signal processing device of claim 6, wherein the digital signal processing module comprises:
an window function unit, for performing the window function transformation on the digital receiving signal, to obtain the window transformation signal corresponding to the digital receiving signal;
a fast Fourier transform unit, for performing the time-domain to frequency-domain conversion on the window transformation signal, to obtain the spectrum signal of the window transformation signal;
a double round spectrum detection unit, for performing two beat frequency detections on the spectrum signal; and
a range and velocity estimation unit, for determining distances and speeds of the plurality of targets in comparison to the FMCW radar system according to results of the two beat frequency detections.

13. The signal processing device of claim 12, wherein the double round spectrum detection unit comprises:
a first round beat frequency detection unit, for performing a first round beat frequency detection on the spectrum signal, to determining spectrum components greater than a first threshold value within the spectrum signal, to obtain an integer part of a plurality of normalized beat frequencies;
a spectrum peak location estimation unit, for determining a fractional part of the plurality of normalized beat frequencies according to the integer part of the plurality of normalized beat frequencies;
a complex gain estimation unit, for determining a complex gain of the spectrum signal according to the integer part of the plurality of normalized beat frequencies;
a spectrum component cancellation unit, for cancelling a frequency component of the spectrum signal according to the integer part of the plurality of normalized beat frequencies, the fractional part of the plurality of normalized beat frequencies, and the complex gain of the spectrum signal, to obtain a double round spectrum signal, wherein the double round spectrum signal corresponds to normalized beat frequencies of the targets not detected in the first round beat frequency detection; and
a second round beat frequency detection, for performing a second round beat frequency detection on the double round spectrum signal, to determining spectrum components greater than a second threshold value within the spectrum signal.

* * * * *